United States Patent [19]

Barnsbee

[11] 4,050,124
[45] Sept. 27, 1977

[54] WEB STRETCHING APPARATUS
[75] Inventor: Clive D. Barnsbee, Webster, N.Y.
[73] Assignee: Eastman Kodak Company, Rochester, N.Y.
[21] Appl. No.: 600,667
[22] Filed: July 30, 1975
[51] Int. Cl.² .......................... D06C 3/00; B29D 7/24
[52] U.S. Cl. .......................................... 26/73; 26/90; 26/94
[58] Field of Search ...................... 26/73, 90; 264/289; 425/66

[56] References Cited
U.S. PATENT DOCUMENTS

| | | | |
|---|---|---|---|
| 2,571,355 | 10/1951 | Gardner | 26/73 X |
| 3,833,973 | 9/1974 | Schwarz | 26/73 |
| 3,902,230 | 9/1975 | Schwarz | 26/73 |

Primary Examiner—Robert R. Mackey
Attorney, Agent, or Firm—Torger N. Dahl

[57] ABSTRACT

An apparatus for longitudinally stretching a web comprising a pair of spaced apart rotatable members. Associated with each member are a plurality of angularly spaced primary clamps, each radially movable outward, during member rotation, from a primary web engaging position, in which the primary clamps initially engage the edges of the web being transported between the members, for longitudinally stretching the clamped web. Further associated with each member is a plurality of angularly spaced secondary clamps, each angularly interposed between primary clamps and radially movable outward during member rotation from a secondary web engaging position, which is spaced radially outward from the primary web engaging position. The secondary clamps engage the intermediate edges of the web extending between primary clamps, thereby minimizing edge scalloping of the web during continued stretching thereof in unison with engaged primary clamps. In one embodiment, biaxial web stretching is effected by locating the rotatable members in diverging, non-parallel planes.

9 Claims, 15 Drawing Figures

WEB STRETCHING APPARATUS

BACKGROUND OF THE INVENTION

1. Field of the Invention

This invention is generally related to a rotary apparatus having the capability of stretching the longitudinal (travel) dimension of a moving web. More particularly, the invention relates to an apparatus which provides additional engagement of a web whose edges have been initially engaged and partially stretched longitudinally, thereby minimizing scalloping during continued longitudinal web stretching.

2. Prior Art

In order to impart improved physical strength to crystallizable polymeric films, such material may be oriented (stretched) by a preselected amount, in the longitudinal or both the transverse and longitudinal dimensions. With respect to orientation in the longitudinal direction, apparatus of the drafter type are commonly employed. Drafters are typically comprised of a series of feed and take-up rollers whereby successive take-up rollers operate at a higher surface velocity than their associated feed rollers. As a result, webs being transported through are elongated in their direction of travel.

A web being elongated exhibits a tendency to compensate for the increasing shrinkage associated therewith a generally undesirable phenomenon known as "necking". In drafter apparatus, necking may be reduced by engaging the lateral web edges with a series of clamps, typically disposed in an endless arrangement for successive web edge engagement immediately after the moving web leaves a feed roller zone. To permit web elongation, the clamps are free-riding in, for example, longitudinal tracks. As the moving web elongates between the feed and take-up rollers, engaged clamps accelerate freely creating progressively increased spacing between adjacent clamps. Consequently, intermediate edges of the web between adjacent clamps begin to exhibit a secondary necking tendency known as "scalloping". Later trimming to remove the defect is wasteful. To overcome this problem, it is necessary in drafters to disengage the clamps from the lateral edges of the web and introduce the web into a duplicate drafter, having more closely longitudinally-spaced clamps, for continued elongation.

Clamps that are adapted to engage intermediate web edges tending to scallop, as above described, are not practical in conventional drafting. Precisely when and where in the course of web travel adjacent engaged clamps begin to draw apart during web stretching is dependent on a number of factors, such as web temperature and speed difference between feed and take-up rollers. For example, at higher web temperatures, web stretching and drawing apart of the clamps may be more pronounced at an early point between feed and take-up, whereas at lower web temperatures and low speed differences, web stretching and drawing apart of the clamps may take place at another unpredictable and later point. As can be appreciated, the synchronization of additional clamps into a drafter is particularly difficult and the apparatus is subject to breakdown when processing conditions are altered slightly.

In this context, a definite need has arisen for the introduction within one apparatus of additional clamps to secure intermediate web edges of a partially stretched web.

In contrast to drafter longitudinal stretching wherein clamps are freely accelerating in response to and under control of the stretching web, longitudinal stretching in other prior art apparatus is governed by mechanically controlled clamp acceleration. For example, in U.S. Pat. Nos. 2,571,355 and 3,833,973, rotary devices, comprising rotatable members, are described wherein the longitudinal spacing of adjacent angularly spaced clamps carried by the members is fixed by their position within associated radial slots in the members. During rotation of the members, the clamps in each member are cammed or urged radially outward, by eccentric camming surfaces, to positions of greater longitudinal spacing in a controlled and predictable manner. However, the clamps described in such prior art are suitable only for engaging a web edge which is approaching these clamps in a radially inward direction from the periphery of the circular members, typically occurring, for example, when a web first enters the apparatus. In particular, the clamps in these patents are shown as having fixed platens (base plates) which are closer than the approaching web to the axes of rotation of their associated rotatable members. After web contact with the platen of a given clamp, an outward pivotable jaw closes in a radially inward direction toward the plate to engage the web edge disposed therebetween. Thereafter web elongation occurs, during rotation of the members by the clamp camming mechanism, as described. Neither of these patents, however, discloses or suggests how to provide additional engagement of a partially stretched web along its intermediate edges extending between adjacent clamps and wherein the web is moving radially outward, for minimizing scalloping during continued stretching.

According, in dealing with the problem of scalloping along intermediate web edge spans appearing between accelerating adjacent clamps during longitudinal stretching of a web, prior art drafting operations disadvantageously require duplicate apparatus in series to provide engagement of the web at closer web edge intervals. Furthermore, prior art rotary-acting apparatus fail to disclose or suggest the need for additional engagement of a partially stretched web along its intermediate edges.

SUMMARY OF THE INVENTION

In accordance with a preferred embodiment of the invention, a rotary-acting apparatus for the longitudinal stretching of a web is disclosed comprising a pair of spaced apart rotatable members carrying conventional angularly spaced clamps (referred to herein as primary clamps). Each clamp is guided generally radially outwardly by an associated rotatable member from a primary web engaging position, in which the primary clamps initially engage the edge of a web, for stretching the web. In addition, the rotatable members carry a plurality of angularly spaced secondary clamps, angularly interposed between the primary clamps, and each similarly guided generally radially outwardly by an associated rotatable member fromm a secondary web engaging position in which the secondary clamps initially engage the intermediate edge of a partially stretched web extending between engaged primary clamps, for continued stretching of the web. The secondary web engaging position is radially spaced from the primary web engaging position. The secondary clamps minimize edge scalloping of the web during continued stretching of the web in unison with engaged primary clamps.

In accordance with the invention, a stationary cam is associated with each member for successively contacting and camming each primary clamp radially outwardly from its primary initial engaging position, and thereafter each interposed secondary clamp radially outwardly from its secondary engaging position, upon rotation of the rotatable members.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Figure 1:
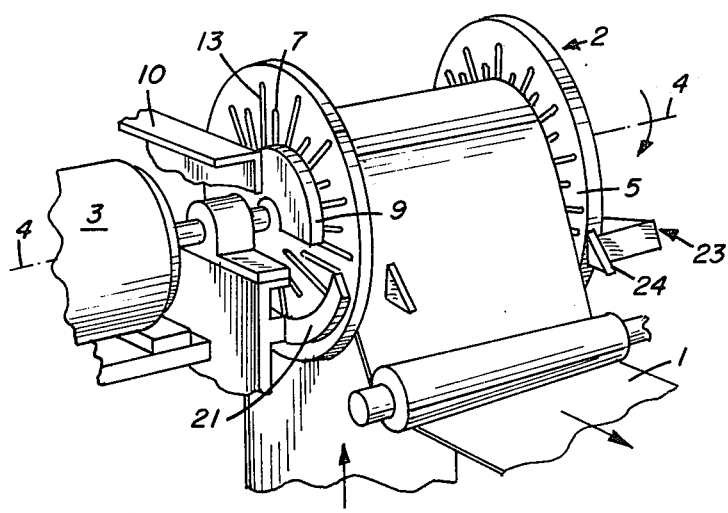
FIG. 1 is an overall perspective view of a preferred embodiment of the web stretching apparatus of this invention.
Figure 2:
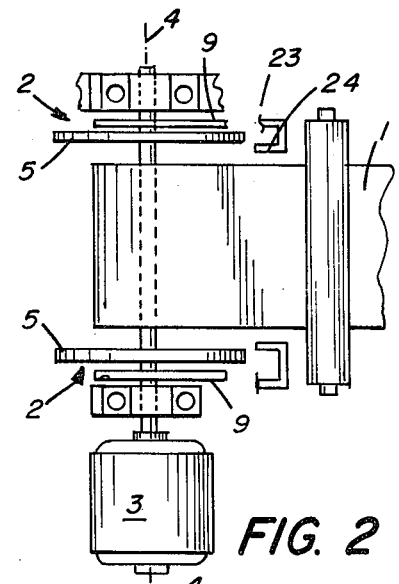
FIG. 2 is a schematic plan view of the embodiment shown in FIG. 1.
Figure 3:
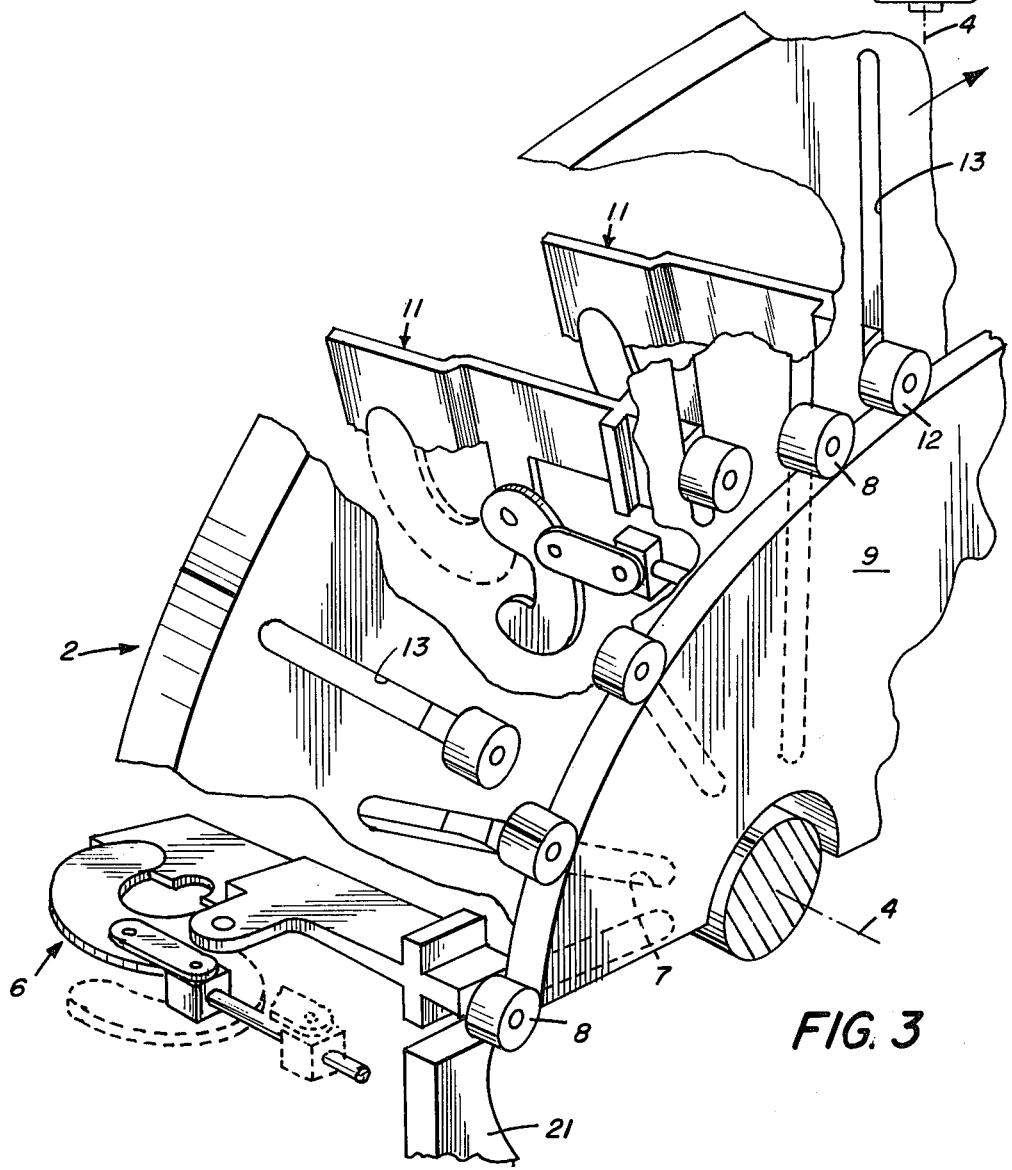
FIG. 3 is a partial cutaway perspective view illustrating the relative spacing and configuration of primary and secondary clamps.

With reference to FIGS. 1, 2 and 3, an apparatus for longitudinal stretching of a web 1 comprises a pair of spaced apart rotatable members 2 which are rotated in unison by suitable means such as a motor 3 about their central axes 4. Preferably (FIGS. 1 and 2), the faces 5 of members 2 are planar and parallel to one another, and the axes 4 extend perpendicular to their associated faces 5 and are coaligned with each other.

Figure 11:
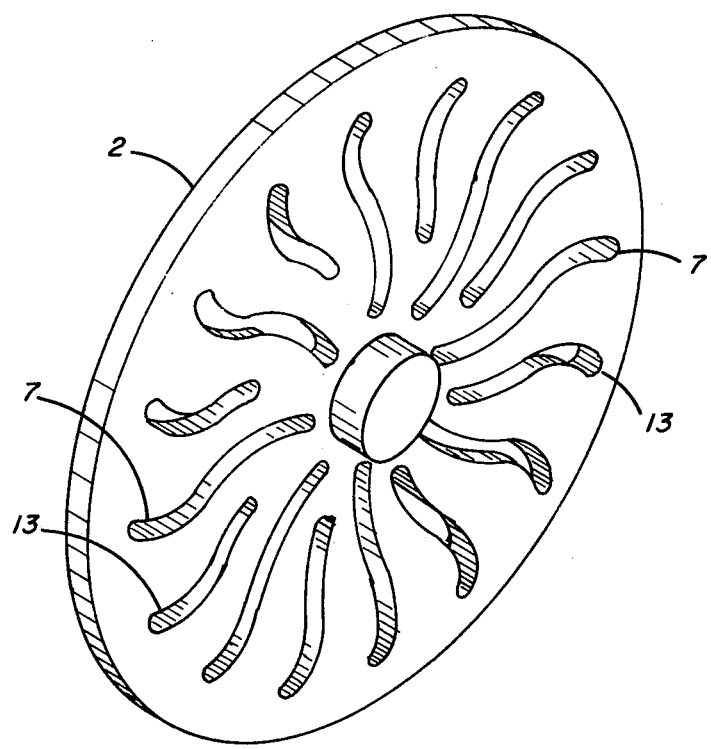
FIG. 11 is a perspective view of an alternative rotatable member for driving clamps in S-shaped paths.

From the faces 5 of the respective members 2 extend a plurality of angularly spaced primary clamps 6 which are each engaged by a rollably attached primary clamp cam follower 8 on the reverse side of the faces 5 (FIG. 3). Each primary clamp 6 is carried by a member 2 in a primary slot 7 and guided thereby for generally radial movement outward from a preselected point designated its primary web engaging position. Radial movement, as used herein, may be along a nonlinear path such as an s-shaped path (as shown on FIG. 11) disclosed in U.S. Pat. No. 3,682,065. To impart outward radial movement to the primary clamps 6 from their primary web engaging positions upon rotation of the members 2, a cam 9 is provided upon which primary clamp cam followers 8 ride (FIG. 3). The cam 9 is stationary relative to the rotary movement of the members 2, being mounted on a suitable fixed bracket 10 (FIG. 1), and is eccentrically disposed to the respective axis of rotation 4.

As the members 2 rotate, primary clamps 6 are moved into overlapping alignment with the edges of a web 1 transported between the members 2 at their primary web engaging positions substantially between quadrants I and IV. Thereafter, primary clamp cam followers 8 contact cam 9, and the primary clamps 6 are successively actuated to engage the lateral edge of the web 1. In quadrant II (FIG. 4B), primary clamp cam followers 8 continue riding on cam 9 and primary clamps 6 disengage the web 1 substantially between quadrants II and III.

To overcome the problem of edge scalloping that begins to appear on the lengthening intermediate edge of a web, the invention provides a plurality of secondary clamps 11 (FIG. 3) having rotatable secondary clamp cam followers 12 mounted on one end thereof. Each secondary clamp 11 is carried by a member 2, in a secondary slot 13 and interposed between primary clamps 6, and guided thereby for generally radial movement outward from a preselected point designated its secondary web engaging position. Secondary web engaging positions are, furthermore, radially spaced outward from primary web engaging positions. During member rotation, (FIGS. 3 and 4B, Quadrant II), secondary clamps 11 are moved into overlapping alignment at their secondary web engaging positions, with the intermediate edges of the web extending between a pair of engaged primary clamps 6. Thereafter, secondry clamp cam followers 12 contact cam 9, and the secondary clamps 11 are successively actuated at their secondary engaging positions to engage intermediate edges of the web. Continued member rotation thereafter imparts outward radial movement to secondary clamps 11 in unison with primary clamps 6, (FIG. 4B, Quadrant II) to thereby provide additional web stretching with a minimum of scalloping. Secondary clamp disengagement takes place at a position substantially between quadrants II and III, and necessarily after outward radial movement of the secondary clamp.

Figure 5:
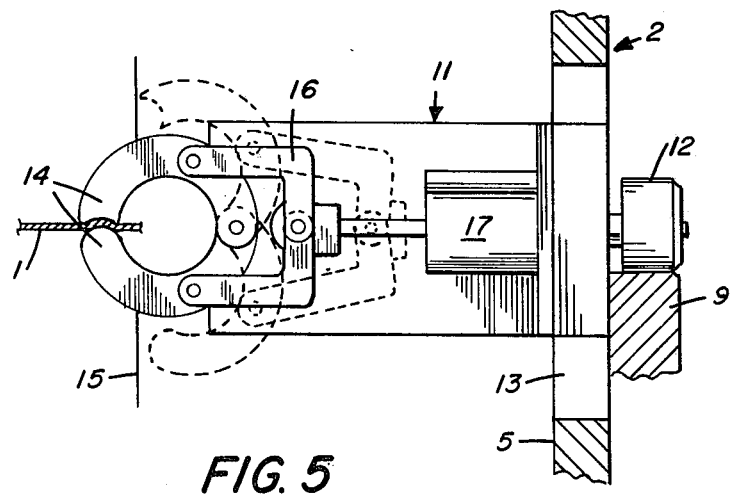
FIGS. 5 and 6 illustrate secondary clamp embodiments.
Figure 6:
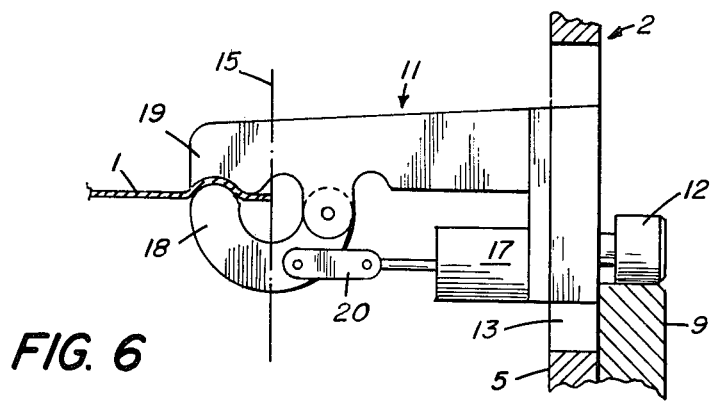

To facilitate unimpeded approach and alignment of an intermediate web edge with secondary clamps 11 after primary clamp 6 web engagement, secondary clamps 11 (FIGS. 5 and 6) may have duplicate jaws 14 that pivot away from the interference line 15 of the intermediate edge of the web 1 (FIG. 5). These jaws can be actuated by suitable linkage means 16 which are further actuated by a solenoid 17 acting in response to contact of the secondary clamp cam followers 12 with cam 9. In another form of the secondary clamp II (FIG. 6), preferably employed in the invention when simultaneous transverse stretching is performed (as described hereinafter), a single jaw 18 is pivotable away from the web edge interference line 15 and adapted after its radially inward approach to engage and clamp an intermediate edge of the web 1 against a fixed platen 19. To permit web approach and alignment, platen 19 is outboard compared to single jaw 18 with respect to the member axis of rotation. As in a duplicate jaw 14, contact of the secondary clamp cam follower 12 with cam 9 actuates solenoid 17 to move a single-jaw linkage means 20 to close the single jaw 18, thereby engaging intermediate edge of the web 1.

It will be understood that primary clamps 6 may similarly be actuated to engage the web in response to contact of their associated primary clamp cam followers 8 with cam 9.

Figure 4A:
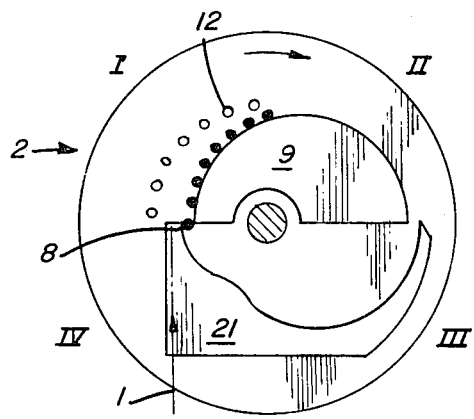
FIGS. 4A-4D comprise four schematic side elevational views of the rotatable members and stationary cam of the apparatus illustrating the position of the primary and secondary clamps by quadrants during a complete cycle of the rotatable member.

To complete the 360° cycle of the rotary apparatus comprising the invention, means can be provided after primary clamp 6 disengagement, to return the disengaged primary clamps 6 radially inward to their primary web engaging positions in quadrant I (FIG. 4A). Typically (FIGS. 4C and 4D), primary clamp cam followers 8 will meet a stationary return cam 21 which urges the primary clamps 6 inward as indicated.

Figure 4B:
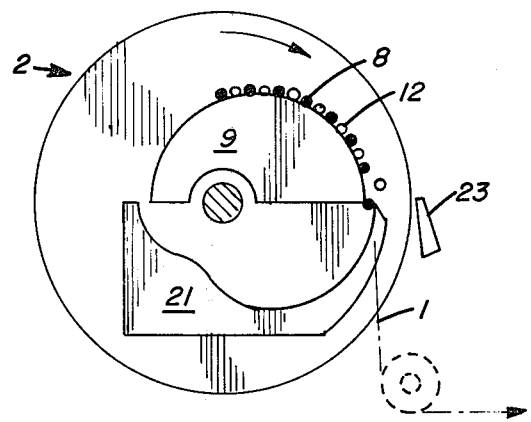
Figure 4C:
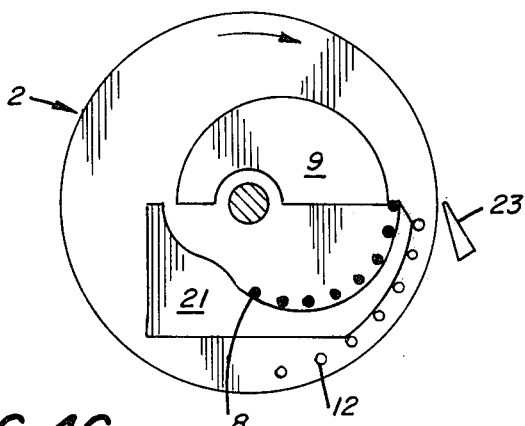
Figure 4D:
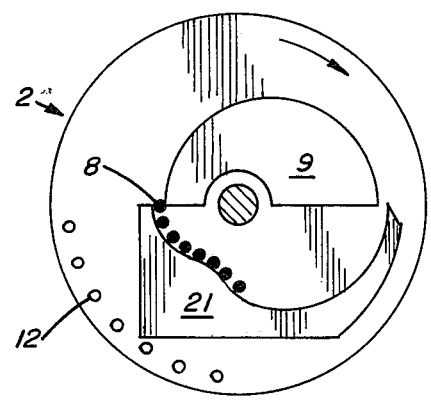
Figure 7:
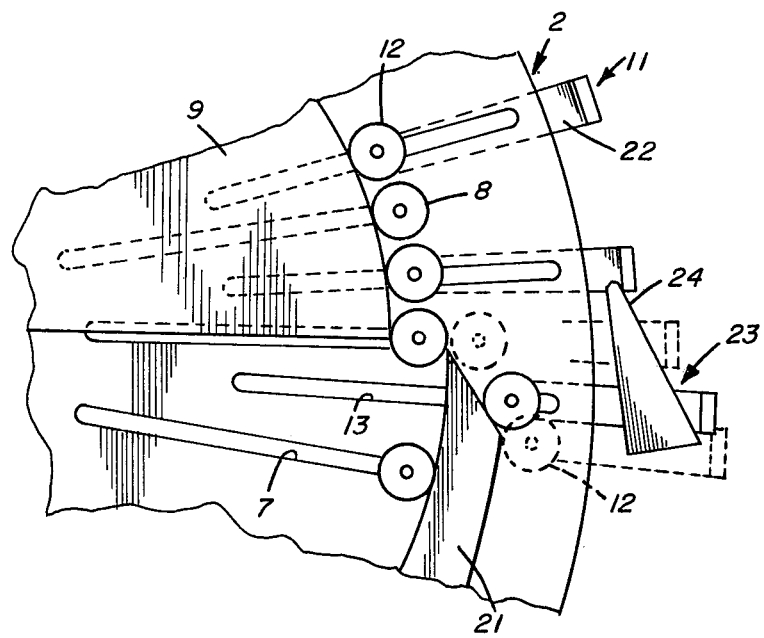
FIGS. 7 annd 8 are views illustrating the means by which primary and secondary clamps are adapted to return from their web disengaging positions to their web engaging positions.
Figure 8:
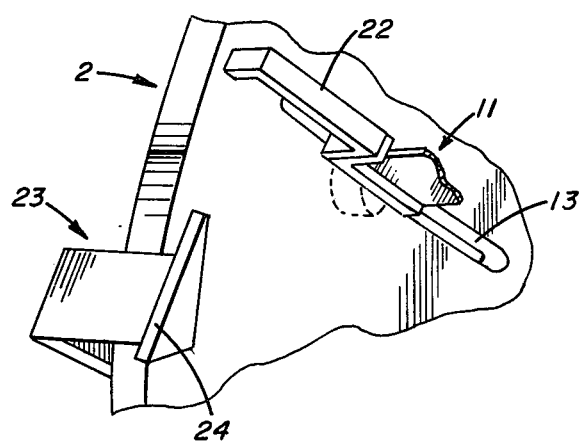
Figure 12:
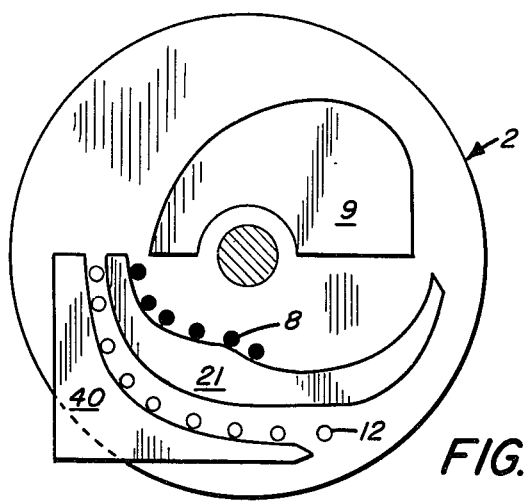
FIG. 12 is a side elevational view of a rotatable member including stationary cams to return primary and secondary clamps to their web engaging positions.

Similarly, means can be provided, after secondary clamp web disengagement, to return the disengaged secondary clamps to their secondary web engaging positions in quadrant II (FIG. 4B). This may be accomplished, for exmple, by providing an extended hook-member 22 (FIGS. 7 and 8) on each secondary clamp 11. Hook-member 22 is configured to ride upon a stationary ramp 23 for camming the secondary clamps 11 outwardly and guiding the secondary clamp cam followers 12 onto a diverting cam surface 24. The cam surface diverts the secondary cam followers 12 from the return path of oncoming primary clamp cam followers 8. Upon continued rotation of the members 2, the secondary clamp cam followers 12 are moved by gravity to the peripheral ends of their respective slots 13 in quadrants III and IV; in quadrant I the secondary clamp cam followers 12 are gravity-fed to their secondary web engaging positions. If desired, alternative secondary clamp return means may be provided, such as a suitable secondary clamp cam return 40, such as shown in FIG. 12.

The mechanism of primary clamp and secondary clamp disengagement may vary using conventional methods within the skill of the art. Such disengagement both for primary and secondary clamps may be the reverse of the engagement mechanism illustrated in FIG. 5. For example (FIG. 7), each primary clamp may be actuated to disengage when its associated cam follower 8 is carried past its last point of contact with cam 9 and released therefrom. Thereafter, the primary clamp's solenoid (not shown) will act in response to such release, and cause its associated linkage means to open its associated jaws, thereby releasing primary clamp engagement with the web. In a similar manner (FIG. 7), each secondary clamp may be actuated to disengage when its cam follower 12 is released from contact with cam 9 when its associated extended-hook member 11 contacts and slides up on stationary ramp 23.

Figure 9:
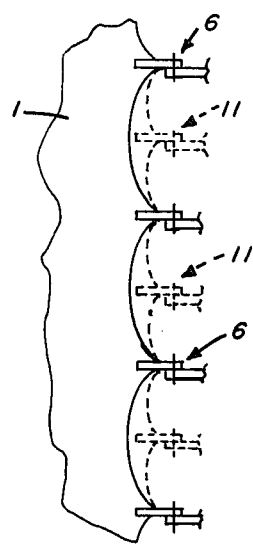
FIG. 9 illustrates how the invention minimizes edge scalloping.

The advantages of providing secondary web engagement are illustrated in FIG. 9. With such engagement, web edge scalloping (shown in solid line) is more pronounced and, after trimming, more wasteful compared to the effects of minimized scalloping (shown in dotted line) provided by the invention.

Figure 10:
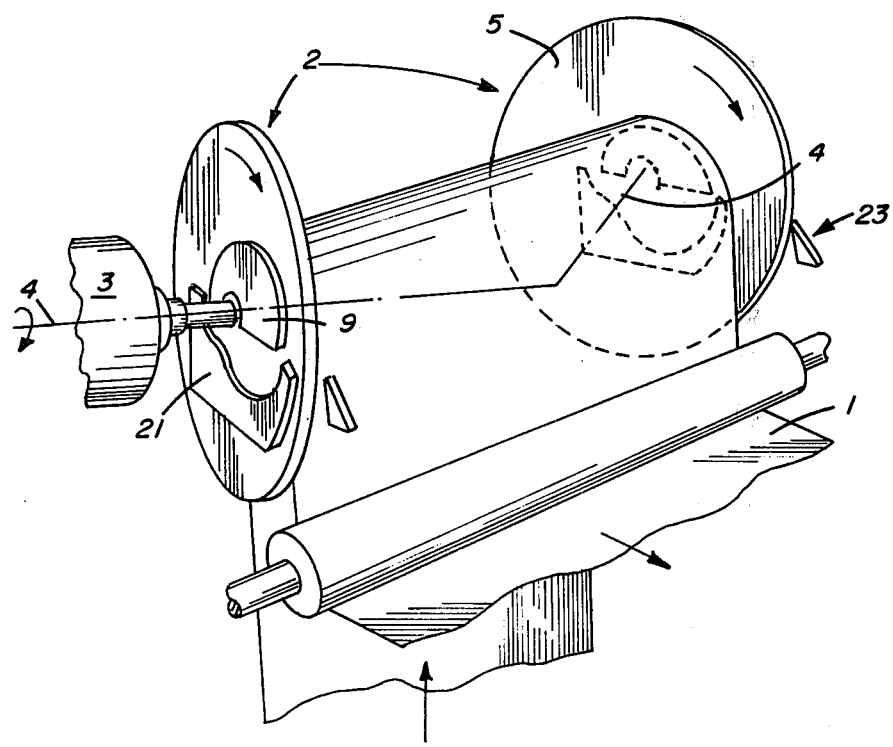
FIG. 10 illustrates another preferred embodiment of the invention wherein transverse web stretching is performed simulanteously with longitudinal web stretching.

The invention described above is useful for simple longitudinal stretching operations wherein the rotatable members define parallel faces. However, in another form of longitudinal stretching, the web is simultaneously stretched in the transverse direction, commonly referred to as simultaneous biaxial stretching. It can be accomplished by modifying the apparatus geometry defined by the rotatable members. Instead of being parallel, the rotatable members may be non-parallel. For example, they may be either planar and canted toward each other (FIG.10) similar to the non-parallel rotatable members described in U.S. Pat. No. 3,833,973, or conical as in the rotatable members described in U.S. Pat. No. 2,571,355. Whichever geometric configuration is defined by the rotatable members, the foregoing detailed discussion (as illustrated by FIGS. 1-9, 11 and 12) regarding the invention remains unchanged. In particular, the mechanism of primary and secondary clamp engagement and disengagement, the radially outward urging of clamps by means of stationary cams, the rotational drive means, and the slots for guiding the primary and secondary clamps, etc. all are applicable regardless of the geometric configuration of the rotatable members. When employing non-parallel rotatable members, simultaneous lateral stretching of the web is provided by adapting primary clamps 6 and secondary clamps 11 to engage the entering web in their normal sequence where the opposing members are relatively closely spaced, and disengage where the members are more widely spaced. In a simultaneous biaxial stretcher of the invention the duplicate jaw secondary clamp embodiment (FIG. 5), or the single jaw embodiment (FIG. 6), can be employed. With the latter, further radially outward camming is required, after web disengagement, to provide sufficient transverse spacing between corresponding platens 19 on opposing rotatable members to permit unimpeded web entrance and exit.

I claim:

1. An apparatus for stretching a web in which longitudinal stretching of the web is accomplished comprising:

a pair of spaced apart rotatable members each having an axis of rotation;

means for rotating said members in unison about their axes of rotation;

a plurality of angularly spaced primary clamps carried and guided by each of said members for generally radial movement outward from a primary web engaging position;

means for actuating each of said primary clamps at its primary web engaging position when moved into overlapping alignment with the edges of a web transported between said members for successively engaging the edges of the web;

a plurality of angularly spaced secondary clamps carried and guided by each of said members for generally radial movement outward from a secondary web engaging position radially spaced from said primary web engaging position, said secondary clamps being angularly interposed between said primary clamps;

means for actuating each of said secondary clamps at its secondary web engaging position when moved into overlapping alignment with the intermediate edges of the web extending between a pair of web engaged primary clamps for successively engaging the intermediate edges of the web;

a stationary cam associated with each of said members and adapted upon rotation of said members to successively contact and cam (1) each of said primary clamps radially outwardly from its primary web engaging position whereupon initial stretching of the web takes place, and (2) each of said secondary clamps radially outwardly from its secondary web engaging position whereby continued stretching of the web occurs with minimum scalloping of the web edge, each of said primary clamps being actuated at a primary web disengaging position for successively disengaging the edges of the web, means operative in response to rotation of said members to return said primary clamps after disengagement to their primary web engaging positions, each of said secondary clamps being actuated at a secondary web disengaging position for successively disengaging the intermediate edges of the web, and means operative in response to rotation of said members to return said secondary clamps after disengagement to their secondary web engaging positions.

2. The apparatus of claim 1 wherein said rotatable members define parallel opposing planes for guiding said primary and secondary clamps.

3. The apparatus of claim 1 wherein said primary clamps and secondary clamps are guided respectively by primary slots and secondary slots in said rotatable members.

4. The apparatus of claim 3 wherein said primary slots and secondary slots are s-shaped.

5. The apparatus of claim 1 wherein said rotatable members define non-parallel opposing planes and guide said primary and secondary clamps for movement in said planes respectively, wherein said primary and secondary clamps are moved into overlapping alignment with respectively the edges and intermediate edges of the web for engagement therewith where said planes are relatively closely spaced, said primary clamps and said secondary clamps being actuated to disengage the edges of the web where said planes are move widely spaced, thereby simultaneously stretching the web transversely and longitudinally with minimum scalloping of the web edge.

6. The apparatus of claim 5 wherein said stationary cam is eccentrically disposed with respect to the axis of rotation of the associated rotatable member.

7. The apparatus of claim 5 wherein said primary clamps and secondary clamps are guided respectively by primary slots and secondary slots in said rotatable members in said non-parallel planes.

8. The apparatus of claim 7 wherein said primary slots and secondary slots are s-shaped.

9. The apparatus of claim 1 wherein said stationary cam is eccentrically disposed with respect to the axis of rotation of the associated rotatable member.

* * * * *

UNITED STATES PATENT AND TRADEMARK OFFICE
CERTIFICATE OF CORRECTION

PATENT NO. : 4,050,124
DATED : September 27, 1977
INVENTOR(S) : Clive D. Barnsbee It is certified that error appears in the above-identified patent and that said Letters Patent are hereby corrected as shown below:

Column 1, line 5, delete "1"; line 14, delete "2".

Column 2, line 36, change "According" to --Accordingly--;

line 61, change "fromm" to --from--.

Column 3, line 30, change "annd" to --and--.

Column 5, line 17, change "exmple" to --example--.

Column 8, line 7, change "move" to --more--.

Signed and Sealed this

Eleventh Day of April 1978

[SEAL]

Attest:

RUTH C. MASON
Attesting Officer

LUTRELLE F. PARKER
Acting Commissioner of Patents and Trademarks